(12) United States Patent
Bley et al.

(10) Patent No.: US 7,648,648 B2
(45) Date of Patent: Jan. 19, 2010

(54) ANTI-STOKES FLUORESCENT MATERIAL COMPOSITION

(75) Inventors: Bianca Bley, Hanover (DE); Uwe Fischbeck, Sachsenhagen (DE)

(73) Assignee: Honeywell International Inc., Morristown, NJ (US)

( * ) Notice: Subject to any disclaimer, the term of this patent is extended or adjusted under 35 U.S.C. 154(b) by 230 days.

(21) Appl. No.: 10/506,018

(22) PCT Filed: Dec. 13, 2002

(86) PCT No.: PCT/EP02/14254

§ 371 (c)(1), (2), (4) Date: Apr. 28, 2005

(87) PCT Pub. No.: WO03/072682

PCT Pub. Date: Sep. 4, 2003

(65) Prior Publication Data

US 2005/0205846 A1  Sep. 22, 2005

(30) Foreign Application Priority Data

Feb. 27, 2002 (DE) ................. 102 08 397

(51) Int. Cl.
    C09K 11/75   (2006.01)
    G06K 7/12    (2006.01)
    G06K 19/10   (2006.01)
    G07D 7/12    (2006.01)
(52) U.S. Cl. .............. 252/301.4 S; 428/690; 427/7; 427/157
(58) Field of Classification Search ........... 252/301.4 S; 427/7, 157; 428/690
See application file for complete search history.

(56) References Cited

U.S. PATENT DOCUMENTS

| 6,686,074 | B2 * | 2/2004 | Muth et al. | 252/301.5 |
| 6,841,092 | B2 * | 1/2005 | Paeschke et al. | 252/301.4 R |
| 2002/0130303 | A1 * | 9/2002 | Muth et al. | 252/500 |
| 2002/0130304 | A1 * | 9/2002 | Paeschke et al. | 252/500 |

FOREIGN PATENT DOCUMENTS

| DE | 2158313      | * 11/1972 |
| DE | 101 13 266 A1 | 9/2002    |
| DE | 101 13 267 A1 | 9/2002    |
| EP | 1 043 681 A1 | 10/2000   |
| GB | 2 258 659 A  | 2/1993    |
| JP | H03-79693    | 4/1989    |
| JP | S52-3911     | 1/1997    |
| WO | 96/01297 A1  | 1/1996    |
| WO | WO 98/39392  | 9/1998    |

OTHER PUBLICATIONS

Hans U. Güdel; Markus Pollnau, Near-Infrared to Visible Photon Upconversion Processes in Lanthanide Doped Chloride, Bromide and Iodide Lattices, Journal of Alloys and Compounds (2000) pp. 307-315, vol. 303-304. CH.

P.N. Yuocom; J.P. Wittke; I. Ladany, Rare-Earth Doped Oxysulfides for GaAs-Pumped Luminescent Devices; (Journal) Metallurgical Transactons (Mar. 1971), pp. 763-767, vol. 2. US.

E. Bielejec; E. Kisel; A. Silversmith, Red to Blue Up-Conversion in $Y_2SiO_5$: $Tm^{3+}$, Journal of Luminescence, (1997) vol. 72-74, pp. 62-64. US.

* cited by examiner

*Primary Examiner*—C. Melissa Koslow
(74) *Attorney, Agent, or Firm*—Carrie Beatus

(57) ABSTRACT

The invention relates to anti-Stokes fluorescent material compositions which, upon excitation by IR radiation, emits IR radiation without significant quantities of visible blue light being emitted at the same time, and which are therefore suitable as invisible security marks.

17 Claims, No Drawings

ANTI-STOKES FLUORESCENT MATERIAL COMPOSITION

CROSS REFERENCE TO RELATED APPLICATIONS

The present application claims priority to PCT application no. PCT/EP02/14254 filed Dec. 13, 2002, and to German Patent No. 102 08 397.5 filed Feb. 27, 2002. Each of these documents are incorporated herein by reference.

1. Field of Invention

The invention relates to an anti-Stokes fluorescent material composition which can be excited by IR radiation to emit IR radiation without visible blue light being emitted at the same time to a major extent. The fluorescent material composition is therefore particularly suitable for the application to articles of marks not visible to the human eye.

2. Background

Anti-Stokes fluorescent materials, also sometimes called up-conversion fluorescent materials, are known from the state of the art. They are characterized in that, upon excitation by IR radiation of a long wavelength, they emit light of a shorter wavelength and thus higher energy. This phenomenon is due to the fact that, for example, multi-photon processes can take place in the fluorescent material.

The literature on anti-Stokes fluorescent materials is extensive. In particular, there have been various reports on fluorescent materials emitting green or red light, e.g. in WO-A-98/39392, which discloses a non-green anti-Stokes fluorescent material. Anti-Stokes fluorescent materials emitting blue light have also already been described e.g. by E. Bielejec in J. Lumin. 72-74 (1997), pages 62-64. The anti-Stokes fluorescent materials emitting blue light are, in general, compounds doped with thulium. The blue emission is very weak in comparison to the green emission in the anti-Stokes fluorescent materials emitting green light, as three photons of IR-radiation are actually required for one photon of blue light.

The fluorescent material $(Gd_{0.87}Yb_{0.13}Tm_{0.001})_2O_2S$ has been described by P. Yokom in Met. Trans. 2 (1971), pages 763-767. This material, upon excitation by IR radiation, emits blue visible light as well as IR radiation of a shorter wavelength than the exciting radiation. This is, therefore, also an anti-Stokes process. The IR emission band is, however, much more intense as compared to the blue emission, in that only two quanta of infra-red light of longer wavelength are required for one quantum of IR light of a shorter wavelength. However, the fluorescent material also displays, in addition to the said IR band and blue band, an emission of red light.

A feature common to the IR light-emitting anti-stokes fluorescent materials available hitherto is that a portion of the emitted visible light, in particular blue light, is still recognizable to the human eye when the materials are excited by IR radiation. This is particularly disadvantageous when the fluorescent materials are used to mark and authenticate items such as documents, bank notes and credit cards.

An object of the present invention is, therefore, to provide an IR light-emitting anti-Stokes fluorescent material in which the portion of emitted blue light is clearly reduced and which can thus be used for a security mark that is completely invisible to the human eye.

SUMMARY OF THE INVENTION

The fluorescent material composition according to the invention is characterized in that it comprises the chemical elements M, ytterbium, thulium, oxygen and sulfur in a molar ratio relative to each other corresponding to the following formula (I):

$$M_x, Yb_y, Tm_z)_2O_2S \quad (I)$$

wherein M is selected from the group consisting of yttrium, gadolinium and lanthanum; and wherein $x+y+z=1$, $x>0$, $y>0$ and $z \geq 0.0025$.

The invention likewise relates to the process for the preparation of this composition wherein an oxide of M, an oxide of Yb, an oxide of Tm and sulfur are sintered together with a flux. Moreover, the invention relates to a method of marking articles for purposes such as authentication, whereby the composition is applied to the article. In addition, the invention relates to articles so marked.

DETAILED DESCRIPTION OF THE INVENTION

The fluorescent material composition according to the invention is characterized in that it comprises the chemical elements M, ytterbium, thulium, oxygen and sulfur in a molar ratio relative to each other corresponding to the following formula (I):

$$M_x, Yb_y, Tm_z)_2O_2S \quad (I)$$

wherein M is selected from the group consisting of yttrium, gadolinium and lanthanum; and wherein $x+y+z=1$, $x>0$, $y>0$ and $z \geq 0.0025$.

Surprisingly, it is possible, in particular by changing the quantity of thulium, to prepare a fluorescent material composition which displays a greatly reduced blue emission and in addition emits light even more strongly in the IR range.

Upon examination of a fluorescent material $(Y, Yb)_2O_2S:Tm_{0.0018}$, taken as comparison, a maximum blue emission was recorded. Surprisingly, the intensities of the blue band and of the IR band did not change to the same extent when the thulium concentration changed. With increased thulium concentrations, the emission in the IR band surprisingly increases still further in absolute intensity whereas the emission in the blue band increasingly decreases in intensity.

The result is a very low intensity of the blue band and, simultaneously, a very high intensity of the IR emission in the composition according to the invention as defined above.

Such a composition in which z lies in the range from 0.0025 to 0.03, and preferably in the range from 0.0075 to 0.02, has proved particularly favorable.

Furthermore, a composition in which y lies in the range from 0.15 to 0.3 is preferred.

The fluorescent material composition according to the invention can also contain additional chemical elements in addition to those named in Formula (I), it being advantageous if the latter are present in a quantity of less than or equal to 1000 weight parts per million (wppm), preferably less than or equal to 500 wppm and particularly preferably less than or equal to 100 wppm, relative to Yb. Possible additional chemical elements are rare earth metals. Preferred further are rare earth metals selected from the group consisting of dysprosium and samarium.

The invention also relates to an anti-Stokes fluorescent material composition which, when subjected to IR radiation of a wavelength of 975 nm, (i) emits IR light of a wavelength of 796 nm in an intensity $I_{796\,nm}$, based on the intensity of a reference material set to be 100%, and (ii) emits blue light of a wavelength of 480 nm in an intensity $I_{480\ nm}$, based on the intensity of a reference material set to be 100%, wherein the intensity $I_{480\ nm}$ is less than 45% of the intensity $I_{796\ nm}$ and the reference material is $Y_{1.524}Yb_{0.474}Tm_{0.0018}O_2S$.

A composition wherein the intensity $I_{480\ nm}$ is less than 40% of the intensity $I_{796\ nm}$ is preferred. A composition wherein the intensity $I_{480\ nm}$ is less than 30% of the intensity $I_{796\ nm}$ is more preferred, while a composition wherein the intensity $I_{480\ nm}$ is less than 20% of the intensity $I_{796\ nm}$ is even more preferred.

The preferred procedure for the preparation of the composition according to the invention is that an oxide of M, an oxide of Yb, an oxide of Tm and sulfur are sintered together with a flux. The sinter temperature can vary within a wide range, the sintering preferably being carried out at a sinter temperature of 800 to 1300° C., and more preferred at a sinter temperature of 1000 to 1100° C.

Furthermore, it is likewise possible to use at least one of the oxides in the form of a precursor compound which converts into the corresponding oxide under the sintering conditions.

Before the actual sintering, the starting compounds are mixed with each other or ground, in particular finely ground, together. Optionally, the mixture can include water and/or sulfur and/or flux. If fine grinding is carried out in the presence of water, then the suspension of the rare earth metal compounds obtained is dried and subsequently sieved.

In general, compounds or mixtures of these which are capable of forming a (poly)sulfide with sulfur or sulfur-containing rare earth metal compounds upon sintering can be used as fluxes. Possible fluxes are e.g. alkali metal, alkaline-earth metal and ammonium compounds, such as borates, carbonates, hydrogen carbonates, phosphates, hydrogen phosphates, halides and thiosulfates, as well as mixtures of these compounds.

Preferably, the fluorescent material composition according to the invention is used to authenticate articles by providing the articles with the composition in order to form a marked article.

It is further preferred that, to detect the presence of the mark, the marked article is irradiated with IR light and the radiation thereupon emitted by the article is analyzed. As the emitted radiation is in the infrared range, the analysis takes place, as a rule, with usual detectors for IR radiation. It is possible to cover individual bands only or the whole IR spectrum.

The articles to be marked include data carriers and documents, with chip cards, check cards, or credit used in particular as data carriers and identity cards, bank notes, and certificates as documents.

As the fluorescent materials according to the invention are colorless not only upon irradiation with daylight but also upon irradiation with IR light, they generate a mark not recognizable to the observer, which is important for precisely these articles that, like e.g. chip cards, check cards or credit cards as well as identity cards, bank notes and certificates, are often exposed to attempts at forgery. The irradiation of these articles with IR light generates a characteristic IR emission spectrum without significant quantities of visible blue light being emitted at the same time, as occurs with known fluorescent materials. The emission spectra produced by special compositions according to the invention in each case are then a sure sign for the checker of a marked article that the latter was marked with the compositions and that an article is therefore genuine. Consequently, the fluorescent material compositions according to the invention serve to prevent attempts at forgery or to detect attempts at forgery.

The fluorescent material compositions according to the invention can be incorporated per se in a customary manner into the articles to be marked. It is, however, also conceivable that they are used in the form of mixtures with auxiliaries which comprise the fluorescent materials e.g. together with a binder. In particular, acrylic polymers, polyamides, polyurethanes, polyesters and polyethylene terephthalates as well as the corresponding monomers and oligomers can be considered as suitable binders.

Furthermore, it is also conceivable that the fluorescent material compositions according to the invention are used together with a liquid carrier, e.g. in the form of dispersions. Such dispersions can then be used, for example, to impregnate the articles to be marked. Such a procedure is possible for the preparation of articles, e.g. marked safety threads, which are then incorporated into identity cards, bank notes, checks and certificates.

Finally, the invention also relates to marked articles which comprise the fluorescent material composition according to the invention.

The invention is explained in more detail in the following examples.

EXAMPLES

Examples 1 to 16

A total of 16 different fluorescent material compositions according to the invention were prepared. Radiation intensities of the emitted light were analyzed with a Shimadzu spectro fluoro photometer RF 5000 having an extended wave length range.

To this end, firstly, mixtures of $Y_2O_3$, optionally replaced by $Gd_2O_3$ or $La_2O_3$, with $Yb_2O_3$, $Tm_2O_3$, $Na_2CO_3$, $K_2CO_3$, S and $Na_3HPO_4$, were produced. These mixtures were introduced into an aluminum oxide crucible and calcined for several hours in a furnace at 1000-1100° C. After cooling to room temperature, the calcined products were removed, stirred in water, and, after several washings with water, disagglomerated by grinding in a ball mill and then washed with a hydrochloric acid and ammonia solution. After filtering off and drying in a drying cupboard, solid powders were obtained which were sieved by means of a stainless-steel sieve (mesh size 80 um).

In the following Table 1, the quantities of starting materials used in each case, the yields obtained of the fluorescent materials according to the invention and the corresponding formulae are given. In addition, for all fluorescent materials prepared, the intensity of the emitted blue light of a wavelength of 480 nm, referred to as $I_{480\ nm}$, and the intensity of the emitted IR radiation at 796 nm, referred to as $I_{796\ nm}$, are given. The value for $I_{480\ nm}$ is based on the intensity of the emitted blue light of a wavelength of 480 nm of a reference material whose intensity was arbitrarily set to be 100%. Likewise, the value for $I_{796\ nm}$, is based on the intensity of the emitted IR light of a wavelength of 480 nm of a reference material whose intensity was also arbitrarily set to be 100%. In both cases the reference material was $Y_{1.524}Yb_{0.474}Tm_{0.0018}O_2S$ which in the table is mentioned as "comparison" and which is a conventional fluorescent material with small quantities of thulium. In all experiments excitation took place with a xenon short-arc lamp which emitted IR radiation of a wavelength of 975 nm.

Additionally, table 1 includes values for the percentage of the emitted blue light in form of values for the expression.

$$I_{480\,nm}/I_{796\,nm} \times 100\%$$

It is apparent that the fluorescent materials according to the invention emit a quantity of blue light that is clearly reduced relative to the emitted IR radiation, which is very desirable. It is very surprising that this could be achieved in particular by increasing the quantity of Tm.

Furthermore, examples 6 to 8 show that, even with the addition of small quantities of other substances such as $Dy_2O_3$ and $Sm_2O_3$, fluorescent materials with a low blue-light emission can be prepared.

wherein $I_{480\,nm}$ is expressed as a percentage of the intensity of visible blue light emitted from a reference composition consisting of $Y_{1.524}Yb_{0.474}Tm_{0.0018}O_2S$ when said reference composition is subjected to IR radiation having a wavelength of 975 nm; and wherein $I_{480\,nm}$ is less than 45% of said $I_{796\,nm}$.

2. The composition of claim 1, wherein z is from 0.0075 to 0.02.

3. The composition of claim 1, wherein y is from 0.15 to 0.3.

TABLE 1

| Example | $Y_2O_3$ [g] | $Yb_2O_3$ [g] | $Tm_2O_3$ [g] | $Na_2CO_3$ [g] | $K_2CO_3$ [g] | S [g] | $Na_2HPO_4$ [g] | Formula | Intensity [%] $I_{480\,nm}$ | Intensity [%] $I_{796\,nm}$ | $I_{480\,nm}/I_{796\,nm} \times 100\%$ | Yield [g] | Comment |
|---|---|---|---|---|---|---|---|---|---|---|---|---|---|
| Comparison | | | | | | | | $Y_{1.524}Yb_{0.474}Tm_{0.0018}O_2S$ | 100 | 100 | | | |
| 1 | 48.31 | 26.36 | 0.54 | 15.38 | 20.05 | 30.75 | 5.33 | $Y_{1.516}Yb_{0.474}Tm_{0.01}O_2S$ | 40 | 115 | 35 | 79.5 | |
| 2 | 47.03 | 26.36 | 2.72 | 15.38 | 20.05 | 30.75 | 5.33 | $Y_{1.476}Yb_{0.474}Tm_{0.05}O_2S$ | 0 | 14 | 0 | 82.1 | |
| 3 | 47.67 | 26.36 | 1.63 | 15.38 | 20.05 | 30.75 | 5.33 | $Y_{1.496}Yb_{0.474}Tm_{0.03}O_2S$ | 0 | 36 | 0 | 80.3 | |
| 4 | 58.37 | 8.79 | 0.54 | 15.38 | 20.05 | 30.75 | 5.33 | $Y_{1.832}Yb_{0.158}Tm_{0.01}O_2S$ | 0 | 16 | 0 | 72.7 | |
| 5 | 45.88 | 30.58 | 0.54 | 15.38 | 20.05 | 30.75 | 5.33 | $Y_{1.44}Yb_{0.55}Tm_{0.01}O_2S$ | 24 | 94 | 26 | 92.4 | |
| 6 | 48.31 | 26.26 | 0.54 | 15.38 | 20.05 | 30.75 | 5.33 | $Y_{1.516}Yb_{0.474}Tm_{0.01}O_2S$ | <5 | 56 | <9 | 80.3 | 100 ppm $Dy_2O_3$ |
| 7 | 48.31 | 26.36 | 0.54 | 15.38 | 20.05 | 30.75 | 5.33 | $Y_{1.516}Yb_{0.474}Tm_{0.01}O_2S$ | <5 | 29 | <17 | 79.2 | 200 ppm $Dy_2O_3$ |
| 8 | 48.31 | 26.36 | 0.54 | 15.38 | 20.05 | 30.75 | 5.33 | $Y_{1.516}Yb_{0.474}Tm_{0.01}O_2S$ | 10 | 48 | 21 | 80.0 | 100 ppm $Sm_2O_3$ |
| 9 | 48.14 | 26.36 | 0.82 | 15.38 | 20.05 | 30.75 | 5.33 | $Y_{1.511}Yb_{0.474}Tm_{0.015}O_2S$ | 15 | 73 | 21 | 79.4 | |
| 10 | 50.72 | 22.13 | 0.54 | 15.38 | 20.05 | 30.75 | 5.33 | $Y_{1.592}Yb_{0.398}Tm_{0.01}O_2S$ | 30 | 92 | 33 | 75.2 | |
| 11 | | 26.36 | 0.54 | 15.38 | 20.05 | 30.75 | 5.33 | $Gd_{1.516}Yb_{0.474}Tm_{0.01}O_2S$ | 61 | 162 | 38 | 107.6 | 77.54 g $Gd_2O_3$ instead of $Y_2O_3$ |
| 12 | | 26.36 | 0.54 | 15.38 | 20.05 | 30.75 | 5.33 | $La_{1.516}Yb_{0.474}Tm_{0.01}O_2S$ | 8 | 21 | 38 | 101.4 | 69.69 g $La_2O_3$ instead of $Y_2O_3$ |
| 13 | 48.38 | 26.36 | 0.41 | 15.38 | 20.05 | 30.75 | 5.33 | $Y_{1.5185}Yb_{0.474}Tm_{0.075}O_2S$ | 15 | 80 | 19 | 77.3 | |
| 14 | 48.22 | 26.36 | 0.68 | 15.38 | 20.05 | 30.75 | 5.33 | $Y_{1.536}Yb_{0.474}Tm_{0.0125}O_2S$ | 44 | 120 | 37 | 80.5 | |
| 15 | 48.31 | 26.36 | 0.54 | 30.75 | | 30.75 | 5.33 | $Y_{1.516}Yb_{0.474}Tm_{0.01}O_2S$ | 55 | 131 | 42 | 77.8 | |
| 16 | 48.31 | 26.36 | 0.54 | | 40.1 | 30.75 | 5.33 | $Y_{1.516}Yb_{0.474}Tm_{0.01}O_2S$ | 18 | 65 | 28 | 79.8 | |

The invention claimed is:

1. An anti-Stokes fluorescent composition comprising M, ytterbium, thulium, oxygen, and sulfur in a molar ratio relative to each other corresponding to the following formula:

$$(M_x,Yb_y,Tm_z)_2O_2S$$

wherein M is selected from the group consisting of yttrium, gadolinium, and lanthanum; $x+y+z=1$; $x>0$; $y>0$; and z is from 0.0025 to 0.03, said composition having a fluorescence that, when subjected to IR radiation having a wavelength of 975 nm,
(a) emits IR light having a wavelength of 796 nm with an intensity $I_{796\,nm}$, and
(b) emits visible blue light having a wavelength of 480 nm with an intensity $I_{480\,nm}$, wherein $I_{796\,nm}$ is expressed as a percentage of the intensity of IR light emitted from a reference composition consisting of $Y_{1.524}Yb_{0.474}Tm_{0.0018}O_2S$ when said reference composition is subjected to IR radiation having a wavelength of 975 nm;

4. The composition of claim 1, further comprising at least one lanthanide metal in a proportion less than or equal to 1000 wppm relative to said Yb.

5. The composition of claim 1, further comprising at least one lanthanide metal in a proportion less than or equal to 500 wppm relative to said Yb.

6. The composition of claims 4 or 5, wherein said lanthanide metal is selected from the group consisting of dysprosium and samarium.

7. The composition of claim 1, wherein said $I_{480\,nm}$ is less than 40% of said $I_{796\,nm}$.

8. The composition of claim 7 wherein said $I_{480\,nm}$ is less than 30% of said $I_{796\,nm}$.

9. The composition of claim 8 wherein said $I_{480\,nm}$ is less than 20% of said $I_{796\,nm}$.

10. A process for the preparing an anti-Stokes fluorescent composition comprising the step of sintering together an oxide of M, an oxide of Yb, an oxide of Tm, and sulfur with a flux to produce the composition of claim 1, wherein M is selected from the group consisting of yttrium, gadolinium, and lanthanum.

11. The process of claim 10, wherein the sintering is carried out at a sinter temperature of 800° C. to 1300° C.

12. The process of claim 10, further comprising the step of converting a precursor composition comprising material selected from the group consisting of yttrium, gadolinium, lanthanum, ytterbium, and thulium, into an oxide of said material during said sintering step.

13. A method of authenticating an article comprising the step of providing said article with a composition of claim 1.

14. The method of claim 13, further comprising the step analyzing the radiation emitted from the marked article after the marked article is irradiated with IR radiation.

15. An article of manufacture that has been marked with the composition of claim 1.

16. The composition of claim 1 wherein M is yttrium.

17. The composition of claim 1 wherein M is lanthanum.

* * * * *

UNITED STATES PATENT AND TRADEMARK OFFICE
CERTIFICATE OF CORRECTION

PATENT NO. : 7,648,648 B2 Page 1 of 1
APPLICATION NO. : 10/506018
DATED : January 19, 2010
INVENTOR(S) : Bley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Twenty-third Day of November, 2010

David J. Kappos
*Director of the United States Patent and Trademark Office*